Sept. 23, 1969   J. J. PORADA   3,468,462
APPARATUS FOR FORMING PORTION SIZED FOOD PRODUCTS
Filed April 18, 1967

INVENTOR
JOSEPH J. PORADA
BY Anderson, Luedeka, Fitch, Even & Tabin
ATTORNEYS 3,468,462
Patented Sept. 23, 1969

3,468,462
APPARATUS FOR FORMING PORTION SIZED FOOD PRODUCTS
Joseph J. Porada, Norridge, Ill., assignor to National Dairy Products Corporation, New York, N.Y., a corporation of Delaware
Filed Apr. 18, 1967, Ser. No. 631,728
Int. Cl. B26f 3/00, 3/02; B65h 35/00
U.S. Cl. 225—97     1 Claim

ABSTRACT OF THE DISCLOSURE

An apparatus is provided for cutting a moving sheet of dough into portion sized pieces. First and second counter rotating rolls with mating male and female patterns are provided.

---

The present invention relates generally to portion sized food products and more particularly relates to an apparatus whereby portion sized food products may be produced from dough sheets.

Various food products are known which are produced from dough sheets. It is sometimes desirable to provide portion sized pieces from such dough sheets before distribution to the consumer. Conventional food products which are produced from dough sheets and which are distributed to the consumer in portion sized pieces include cookies, crackers and various snack type food products.

Various apparatus is known for cutting dough sheets into predetermined shapes to provide portion sized pieces. One example of such apparatus is known in the trade as a walking cutter. The walking cutter includes a cutting grid which is disposed over a moving sheet of the dough to be cut. At timed intervals the cutting grid descends onto the moving dough sheet while at the same time moving transversely in the same direction and at the same rate as the moving dough sheet. Such transverse movement is necessary to permit cutting the dough cleanly in the desired predetermined shape. The cutting grid is then retracted to its initial position and the sequence of steps is repeated.

Such prior art apparatus has not been wholly effective or desirable in that complicated and costly means are required for moving the cutting apparatus in timed relation to the moving sheet of dough.

Accordingly, it is an object of the present invention to provide an improved apparatus for cutting dough sheets. It is another object of the present invention to provide an improved apparatus for producing portion sized pieces from dough sheets. It is a further object of the present invention to provide an improved apparatus for producing portion sized pieces from dough sheets. It is a further object of the present invention to provide an improved apparatus for cutting a moving dough sheet into portion sized pieces.

Figure 1:
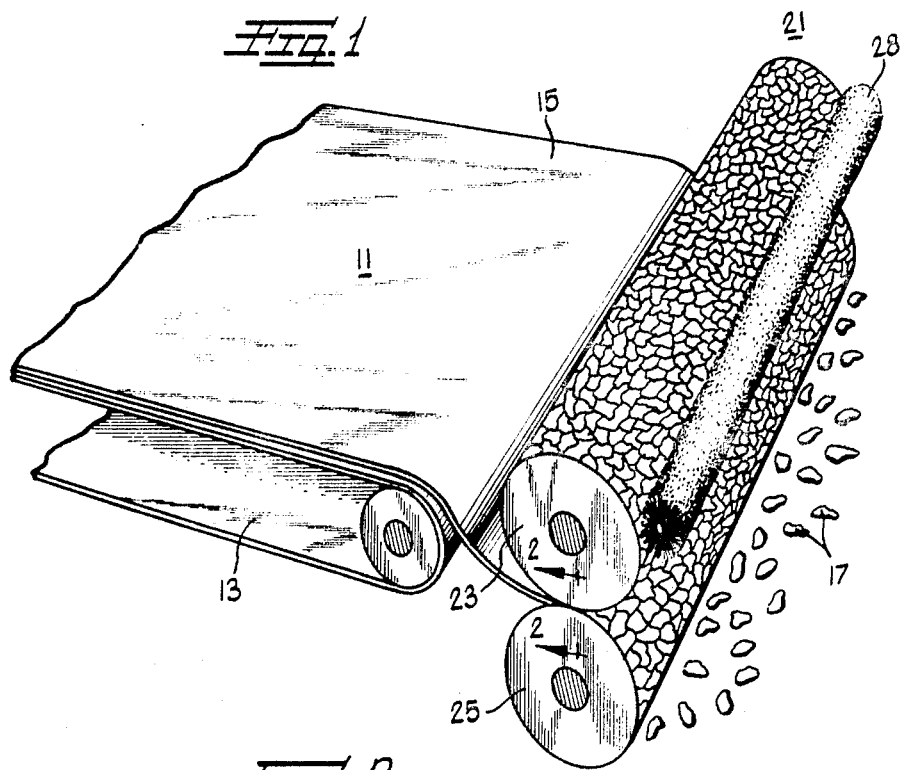
Figure 2:
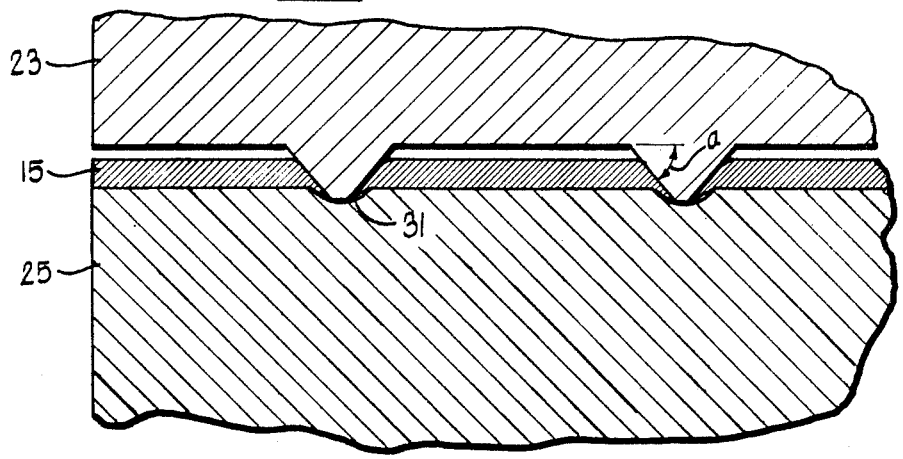

These and other objects of the present invention will become more clear from the following detailed description and accompanying drawings, wherein:

FIGURE 1 is a perspective drawing of apparatus embodying various features of the present invention; and FIGURE 2 is an enlarged view, partially broken away, of section 2—2 of FIGURE 1.

Generally, in accordance with the present invention, a method and apparatus are provided for cutting a moving sheet of dough into pieces of predetermined size and shape by passing the dough between a first roll and a second roll which are counter-rotating and which are provided with mating male and female patterns, respectively.

In particular, referring now to FIGURE 1, apparatus is shown which is adapted for use in the practice of the present invention. The apparatus comprises a dough sheet transport section 11 and a dough sheet cutting section 21. The dough sheet transport section 11 comprises suitable dough sheet transfer apparatus, such as conveyor 13. The conveyor 13 transfers the dough sheet 15 to the dough cutting section 21 which comprises a first roll 23 and a second roll 25. The cutting section 21 may also comprise a brush 27 which is in surface-to-surface contact with first roll 23.

The dough sheet 15 may be any edible food product which is normally produced from a dough sheet and wherein the dough sheet is sufficiently cohesive to be transported in sheet form. Such edible food products comprise cookies, snack type crackers, potato chips and corn chips. The apparatus of the present invention is particularly adapted for cutting dough sheets prepared in accordance with U.S. Patent No. 3,297,450 to Loska.

As best seen in FIGURE 2, the first roll 23 and the second roll 25 are positioned in spaced relation to each other. The first roll 23 is provided with lands 27 which mesh with corresponding grooves 29 in the second roll 25. The lands 27 of the first roll are arranged in a pattern corresponding to the desired predetermined shapes to which the dough sheet is to be cut. The grooves 29 of the second roll are arranged as a mirror image of the pattern of lands 27 of the first roll. This permits intermeshing of the two rolls as they are counter-rotated with respect to each other.

The elastic properties of most dough sheets, and in particular dough sheets prepared in accordance with U.S. Patent No. 3,297,450, are such that cutting of the dough sheet by pressing or rolling a knife-edge cutter onto or over the dough results in incomplete severance of the dough sheet into desired pieces. As shown in FIGURE 2, the lands 27 have a substantially truncated triangular configuration, while the grooves 29 are substantially curved. This results in cutting the dough sheet by pinching the dough in the clearance 31 between the land and the groove. The dough sheet is broken as it passes between the first roll 23 and the second roll 25 when the land 25 meshes with the groove 27 to provide portion sized pieces 17 from the dough sheet 15.

The width 33 of the land 27 should not be so great that segments of the dough sheet are broken loose and carried to the bottom of the groove 29. In general, the lands should be about 1/64 inch in width at the top of the triangle but may be from about 0.005 to about 0.045 inch in width. As can be seen in FIGURE 2, the base of the land is wider than the top so as to provide sufficient rigidity to the land. In general, the base of the land should be wide enough to provide an angle of from about 35 to about 75 degrees.

The grooves 29 are substantially semi-circular in cross-section. The radius and depth of the grooves are not critical, but should be sufficient to permit the top corners of the lands to be meshed below the surface of the female roll by at least about 0.1 inch. For example, a groove radius of .027 inch and a groove depth of 1/64 inch are suitable.

The grooves may be formed in the female roll by any suitable method. One method is to first prepare a hardened male roll having a Rockwell C hardness of about 80. The hardened male roll is then engaged with a blank soft roll and the rolls are then counter-rotated with respect to each other. A perfectly matched female groove pattern is then formed in the soft blank roll, which roll may be subsequently hardened. It is preferred that the female roll be slightly less hardened than the male roll so that wear occurs primarily in the female roll.

The dough pieces, after being cut, may generally be discharged directly into a suitable container or onto a suitable conveyor for transferral to further processing stations. There is, however, some tendency for the dough pieces to stick within the areas in the male roll 23 defined by the lands. Such sticking dough pieces may be dislodged by means of the brush 27 which is in surface-to-surface contact with the male roll 23. The brush 27 is preferably rotated in a direction counter to that of roll 23 so as to cause the dislodged dough pieces to fall downwardly into the container or onto a conveyor.

It will be readily apparent to one skilled in the art that various modifications may be made in the present invention without departing from the scope of the invention.

It is claimed that:

1. Apparatus for cutting an edible dough sheet into pieces of predetermined size and shape which comprise a first roll and a second roll, said first roll having a plurality of male lands, said lands being arranged in spatial relation so as to define areas corresponding to the desired size and shape of the pieces, said second roll having a plurality of female grooves being arranged in mirrored relation to said lands, said lands having a substantially truncated triangular configuration and said grooves having a substantially curved configuration, said rolls being positioned in such spaced relation to each other that said lands and said grooves mesh, and means for rotating said first roll and said second roll in counter-rotating directions so as to cause said lands and said grooves to intermesh during said rotation.

References Cited

UNITED STATES PATENTS

| 420,524 | 2/1890 | Wheeler | 83—345 |
| 705,040 | 7/1902 | Copland | 83—101 X |
| 1,844,884 | 2/1932 | Doane | 83—345 X |
| 2,001,112 | 5/1935 | Schaefer | 83—345 X |
| 3,317,100 | 5/1967 | Flemming et al. | 225—97 |

FOREIGN PATENTS 1,286,006  1/1962  France.

JAMES M. MEISTER, Primary Examiner

U.S. Cl. X.R.

83—101, 345; 225—104